Jan. 25, 1944.   C. L. BEAL   2,340,243
METHOD OF MAKING RUBBER ARTICLES
Filed May 2, 1941
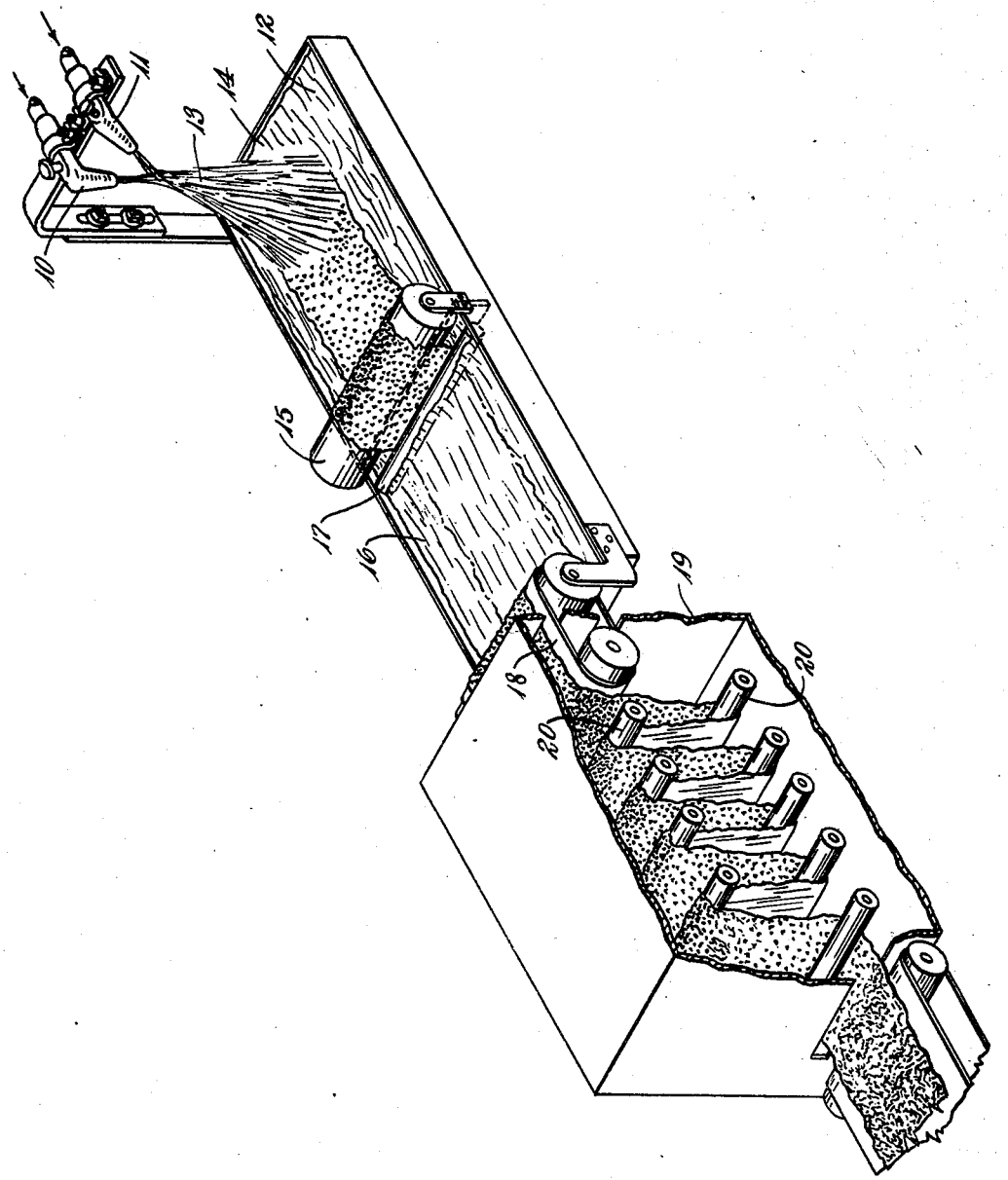
Inventor
Carl L. Beal Patented Jan. 25, 1944

2,340,243

UNITED STATES PATENT OFFICE.

2,340,243

METHOD OF MAKING RUBBER ARTICLES

Carl L. Beal, Cuyahoga Falls, Ohio, assignor to American Anode Inc., Akron, Ohio, a corporation of Delaware Application May 2, 1941, Serial No. 391,525

12 Claims. (Cl. 18—57)

This invention relates to a method of making rubber articles from latex, and particularly to a method of making long continuous lengths of sheet rubber.

I have discovered a method of making rubber articles by depositing rubber onto a liquid deposition surface as by applying latex to the surface of a bath of water or to the surface of a bath of coagulant solution and then coagulating the latex. This can be done conveniently by spraying the latex from an atomizing spray onto the liquid surface. The invention is particularly applicable for making sheet rubber in long continuous lengths as the spraying can be carried on continuously and the deposited rubber withdrawn from the deposition zone under the spray in such a timed relationship to the spraying as to produce a continuous length of sheet rubber in any length desired. However, this invention can also be used to make other rubber articles by intermittently spraying the latex onto the liquid deposition surface and removing the deposited rubber as soon as a desired amount of rubber has been deposited.

In practicing this invention, I either spray latex alone onto the surface of a liquid deposition surface, such as the surface of a solution of a latex coagulant, or spray latex and a latex coagulant onto the deposition surface. Desirably, both sprays should be finely atomized. The latex is coagulated and the deposited rubber is washed, dried, and vulcanized in the finishing operations. Any of the ordinary latex coagulants may be used in this invention although those that are soluble in water are preferred. The coagulants may be dissolved in water or in organic solvents such as acetone or alcohol. Those water-soluble coagulants disclosed in the Willson U. S. Patent No. 1,996,090 are particularly adaptable to this invention and especially the water-soluble salts of polyvalent metals which include such salts as zinc acetate, zinc chloride, zinc nitrate, calcium nitrate, and the like. The coagulants may be used in a concentration of from around 3% by weight of the solvent up to complete saturation. In general, the same coagulant at the same concentration is used both to provide the liquid deposition surface and to provide the coagulant that is sprayed with the latex, when such a procedure is followed.

In practicing this invention the spray nozzle for the latex coagulant and/or the nozzle for the latex may be arranged at any desired distance above the liquid deposition surface so that any desired degree of roughness may be produced in the deposited rubber. In general, the closer the nozzles are to the surface the smoother the rubber, while, conversely, the farther away the nozzles the rougher the rubber. As a practical matter the nozzles will usually be arranged at from 2 inches to 40 inches above the liquid receiving surface. It has also been found that, for any given distance above the liquid surface, the use of a single spray of latex gives a smoother rubber deposit than when two sprays, one of latex and the other of latex coagulant, are used. It will be appreciated that the invention can be used to produce a rubber deposit with widely varying surface characteristics and is adaptable to making smooth sheet rubber, rough sheet, wash cloths, and the like.

The invention can best be understood by reference to the accompanying drawing in which the single figure is a more or less diagrammatic perspective view of apparatus suitable for carrying out one method of the invention.

In the drawing, two atomizing spray nozzles 10, 11 are arranged approximately 24 inches above the surface of a coagulant bath 12 which may comprise 15% zinc acetate in water. The nozzles are so arranged that the two streams emerging from them will converge and commingle about 20 inches above the surface of the coagulant bath 12. In starting the apparatus the nozzle 10 is turned on first to spray latex coagulant consisting preferably of a 15% solution of zinc acetate in water and then immediately the other nozzle 11 is turned on to spray latex. The two atomized streams converge to form a single commingled stream 13 where coagulation of the latex begins even before the streams strike the deposition surface 14 of the coagulant bath 12. The latex spreads over the surface 14 where coagulation is completed. This sheet of latex rubber is then withdrawn over a roller 15 in timed relationship to the depositing of the rubber on the deposition surface 14 so that a sheet of uniform thickness will be produced. In this particular instance the sheet is withdrawn at a linear speed of approximately 8 feet per minute. The sheet of rubber is drawn over the roller 15 and passed through a bath of wash water 16 as by drawing it under a rotatably mounted bar 17 placed in the wash water. From here the rubber sheet passes over a short conveyor 18 and into a heated dryer 19 where the rubber is dried as it is passed over a series of rollers 20, 20. If vulcanized rubber is to be made the rubber sheet is then conveyed to a vulcanizer and vulcanized. The entire operation of making the sheet rubber is continuous and the sheet may be made in any length desired. In stopping the apparatus the coagulant spray nozzle 10 is first turned off and immediately thereafter the latex spray nozzle 11 is turned off.

The bath providing the liquid deposition surface of this invention may comprise any appropriate liquid having a specific gravity greater than the specific gravity of the particular latex composition used. Depending upon the concentration and composition, the specific gravity of uncompounded latex and of ordinary compounded latex compositions may vary in specific gravity from about .99 to .95. Water having a specific gravity of 1.00 is therefore a satisfactory liquid for use as the liquid deposition surface and it is preferred since it is the same material as the liquid vehicle of the latex. Addition of ordinary coagulants to the water of course will raise its specific gravity and increase the differential between it and the latex. Other liquids which do not injure rubber may be used however for the liquid deposition surface so long as these liquids have a specific gravity greater than that of the particular latex composition used.

In this application the term "latex" has been used in its generic sense to include all naturally occurring and artificially prepared coagulable dispersions of either natural or synthetic rubber. Any material may be used as a coagulant that has a coagulating effect on such dispersions.

Although I have disclosed herein a specific example of a preferred method and apparatus for applying my invention I do not intend to limit myself thereto as many modifications may be made in apparatus, procedure, and materials without departing from the spirit and scope of the invention as defined by the following claims.

I claim:

1. The method of making rubber articles which comprises the step of spraying latex onto the surface of a solution of a latex coagulant.

2. The method of making sheet rubber which comprises spraying latex onto the surface of a solution of a latex coagulant, coagulating the latex, and progressively withdrawing the deposited rubber from the deposition zone in timed relationship to the depositing of the rubber.

3. The method of making rubber articles which comprises spraying latex onto the surface of a water solution of a water-soluble latex coagulant and coagulating the latex.

4. The method of making sheet rubber which comprises spraying latex onto the surface of a water solution of a water-soluble latex coagulant, coagulating the latex, and progressively withdrawing the deposited rubber from the deposition zone in timed relationship to the depositing of the rubber.

5. The method of making rubber articles which comprises spraying latex and a water solution of a water-soluble latex coagulant in commingling relation onto the surface of a water solution of a water-soluble latex coagulant.

6. The method of making sheet rubber which comprises spraying latex and a water solution of a water-soluble latex coagulant in commingling relation onto the surface of a water solution of a water-soluble latex coagulant, coagulating the latex, and progressively withdrawing the deposited rubber from the deposition zone in timed relationship to the depositing of the rubber.

7. The method of making sheet rubber which comprises spraying latex and a water solution of a water-soluble latex coagulant in commingling relation onto the surface of a water solution of the same water-soluble latex coagulant, coagulating the latex, and progressively withdrawing the deposited rubber from the deposition zone in timed relationship to the depositing of the rubber.

8. In the production of substantially solid rubber from latex the method which comprises spraying the latex through a substantial space distance, effecting at least partial coagulation of the latex while travelling through said distance, and collecting the so treated latex on a bath of liquid material selected from the class consisting of water, water solutions of latex coagulants and volatile organic solvent solutions of latex coagulants.

9. In the production of substantially solid rubber from latex the method which comprises spraying the latex through a substantial space distance, effecting at least partial coagulation of the latex while travelling through said distance, and collecting the so treated latex on a bath of liquid material having the property of coagulating latex.

10. In the production of substantially solid rubber from latex the method which comprises spraying the latex through a substantial space distance, effecting at least partial coagulation of the latex while travelling through said distance, and collecting the so treated latex on a bath of water.

11. In the production of substantially solid rubber from latex the method which comprises spraying the latex through a substantial space distance, effecting at least partial coagulation of the latex while travelling through said distance, and collecting the so treated latex on a bath of a water solution of a latex coagulant.

12. The method of producing substantially solid rubber from latex which comprises the step of spraying latex onto a bath of liquid material having the property of coagulating the latex.

CARL L. BEAL.